US012731514B2

(12) United States Patent
Hayashi et al.

(10) Patent No.: US 12,731,514 B2
(45) Date of Patent: Sep. 8, 2026

(54) DISPLAY DEVICE

(71) Applicant: Japan Display Inc., Tokyo (JP)

(72) Inventors: Hirotaka Hayashi, Tokyo (JP); Masataka Ikeda, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/096,867

(22) Filed: Apr. 1, 2025

(65) Prior Publication Data

US 2025/0316197 A1 Oct. 9, 2025

(30) Foreign Application Priority Data

Apr. 9, 2024 (JP) ................................ 2024-062719

(51) Int. Cl.
*G09G 3/00* (2006.01)
*G09G 3/36* (2006.01)

(52) U.S. Cl.
CPC ........... *G09G 3/006* (2013.01); *G09G 3/3648* (2013.01); *G09G 2300/0426* (2013.01); *G09G 2310/08* (2013.01); *G09G 2330/12* (2013.01)

(58) Field of Classification Search
CPC ................. G09G 3/006; G09G 3/3648; G09G 2300/0426; G09G 2310/08; G09G 2330/12
See application file for complete search history.

(56) References Cited

U.S. PATENT DOCUMENTS 9,191,663 B2 * 11/2015 Kwak .................. H04N 17/004
2010/0259527 A1 * 10/2010 Odawara ............. G09G 3/3233 345/76
2011/0254822 A1 * 10/2011 Anzai .................... G09G 3/006 345/204
2014/0167769 A1 * 6/2014 Kim ....................... G09G 3/006 324/414
2014/0354286 A1 * 12/2014 Kim ....................... G09G 3/006 324/414
2015/0009105 A1 * 1/2015 Nomura ............... G09G 3/3266 345/76
2015/0014686 A1 * 1/2015 Lv ..................... G02F 1/136259 257/48
2015/0022211 A1 * 1/2015 Du ......................... G09G 3/006 324/414
2015/0379910 A1 * 12/2015 Nishinohara .......... G09G 3/006 345/82
2016/0125775 A1 * 5/2016 Lv .......................... G09G 3/006 345/100
(Continued)

FOREIGN PATENT DOCUMENTS

JP 2006-047455 A 2/2006

*Primary Examiner* — Ryan A Lubit
(74) *Attorney, Agent, or Firm* — XSENSUS LLP

(57) ABSTRACT

According to one embodiment, a display device includes a plurality of first signal line test transistors each having a drain connected to the other end of each respective one of a plurality of signal lines, and a signal line IC chip that applies a first voltage from one end of each of the plurality of signal lines during the light source on period of light sources, and an inspection image control signal is input via the video control test wiring line during the light source on period, thereby setting the first signal line test transistors in an on state, and applying a second voltage different from the first voltage from a source of each of the first signal line test transistors set in the on stat.

8 Claims, 9 Drawing Sheets

(56) References Cited

U.S. PATENT DOCUMENTS

| | | | | |
|---|---|---|---|---|
| 2017/0097529 | A1* | 4/2017 | Kubota | G02F 1/1345 |
| 2017/0141181 | A1* | 5/2017 | Ni | G09G 3/006 |
| 2018/0254226 | A1* | 9/2018 | Iguchi | H01L 25/0753 |
| 2018/0315366 | A1* | 11/2018 | Jia | G09G 3/2007 |
| 2019/0064256 | A1* | 2/2019 | Wang | G01R 31/2843 |
| 2021/0256888 | A1* | 8/2021 | Gao | G09G 3/006 |
| 2022/0076599 | A1* | 3/2022 | Akyol | G09G 3/006 |
| 2022/0366823 | A1* | 11/2022 | Ji | G09G 3/3233 |

* cited by examiner

DISPLAY DEVICE

CROSS-REFERENCE TO RELATED APPLICATION

This application is based upon and claims the benefit of priority from Japanese Patent Application No. 2024-062719, filed Apr. 9, 2024, the entire contents of which are incorporated herein by reference.

FIELD

Embodiments described herein relate generally to a display device.

BACKGROUND

A display device in which a heater is mounted on a liquid crystal display panel has been developed.

DETAILED DESCRIPTION

Figure 1:
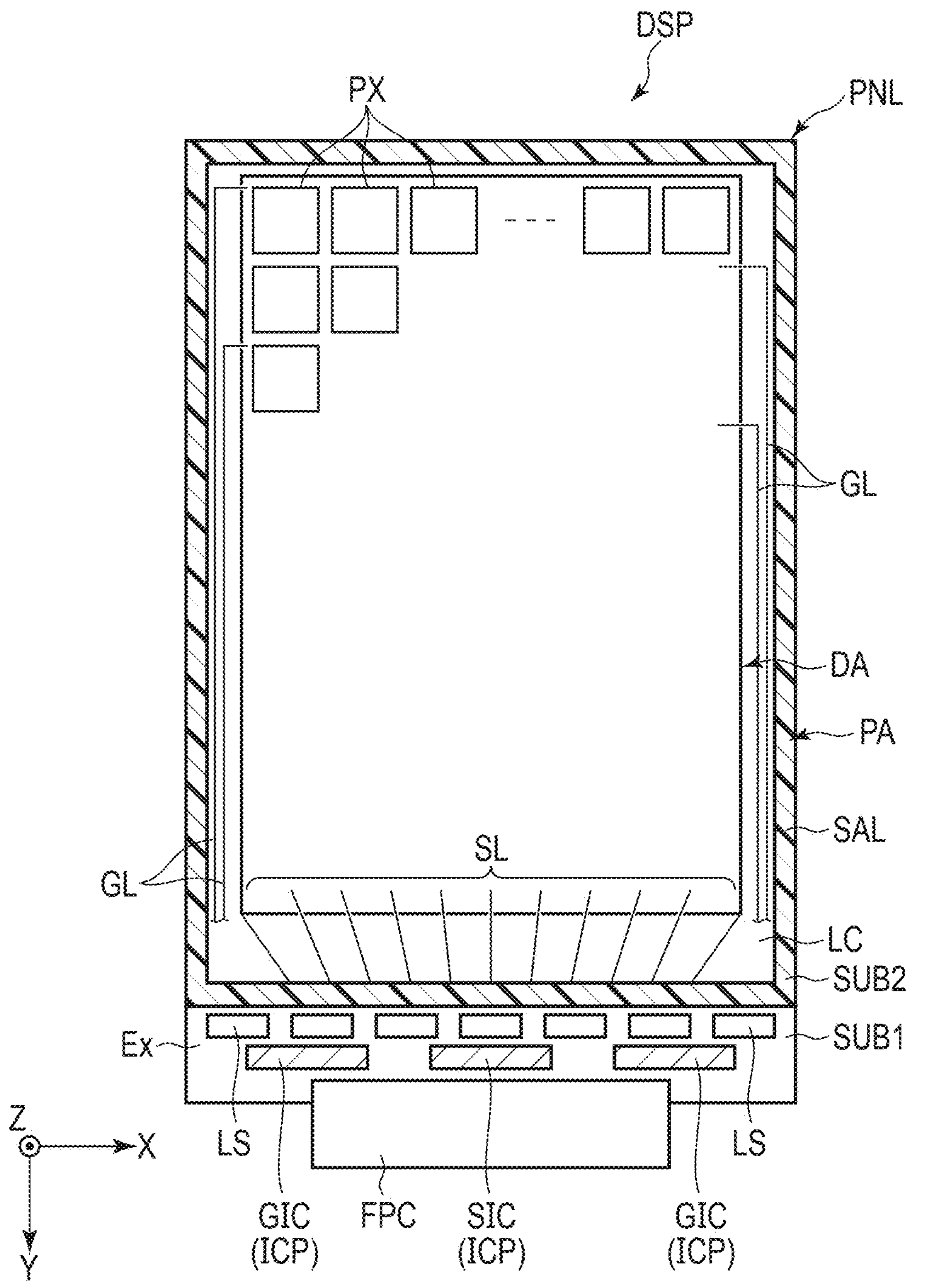
FIG. 1 is a plan view schematically showing a configuration of a display device in Embodiment 1.

In general, according to one embodiment, a display device comprises an array substrate;

a counter-substrate;

an liquid crystal layer provided between the array substrate and the counter-substrate; and a plurality of light sources, wherein the array substrate comprises:

a plurality of scanning lines;

a plurality of signal lines;

a plurality of pixels each provided at an intersection of each one of the plurality of scanning lines and each respective one of the plurality of signal lines;

a signal line test circuit connected to the plurality of signal lines;

a plurality of first signal line test transistors provided in the signal line test circuit and connected to the plurality of signal lines;

a video control test wiring line connected to gates of the plurality of first signal line test transistors;

first video test wiring line connected to sources of the plurality of first signal line test transistors; and a signal line IC chip connected to one end of each of the plurality of signal lines, and a drain of each of the plurality of first signal line test transistors is connected to an other end of each respective one of the plurality of signal lines, the signal line IC chip applies a first voltage from one end of each of the plurality of signal lines during a light source on period of the plurality of light sources, and a video control test signal is input via the video control test wiring line during the light source on period, thereby setting the plurality of first signal line test transistors to an on state, and a second voltage different from the first voltage is applied from the source of each of the plurality of first signal line test transistors set in the on state.

According to another embodiment, a display device comprises an array substrate;

a counter-substrate;

an liquid crystal layer provided between the array substrate and the counter-substrate; and a plurality of light sources, wherein the array substrate comprises:

a plurality of scanning lines;

a plurality of signal lines;

a plurality of pixels each provided at an intersection of each one of the plurality of scanning lines and each respective one of the plurality of signal lines;

a signal line test circuit connected to the plurality of signal lines;

a plurality of first signal line test transistors provided in the signal line test circuit and connected to the plurality of signal lines;

a video control test wiring line connected to gates of the plurality of first signal line test transistors;

a first video test wiring line connected to sources of the plurality of first signal line test transistors;

a signal line IC chip connected to one end of each of the plurality of signal lines; and a plurality of second signal line test transistors provided between the signal line IC and the plurality of pixels, and a drain of each of the plurality of first signal line test transistors is connected to one end of each respective one of the plurality of signal lines, a drain of each of the plurality of second signal line test transistors is connected to an other end of each respective one of the plurality of signal lines, a video control test signal is input via the video control test wiring line during a light source on period of the plurality of light sources, thereby the plurality of first signal line test transistors and the plurality of second signal line test transistors are set in an on state, a first voltage is applied to one end of each of the plurality of signal lines from a drain of each respective one of the plurality of first signal line test transistors set in the on state during the light source on period, and a second voltage that is different from the first voltage is applied to the other end of each of the plurality of signal lines from a drain of each respective one of the plurality of second signal line test transistors set in the on state during the light source on period.

An object of this embodiment is to provide a display device that is restricted by operational environmental conditions.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the optical control element on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

Embodiment 1

Figure 2:
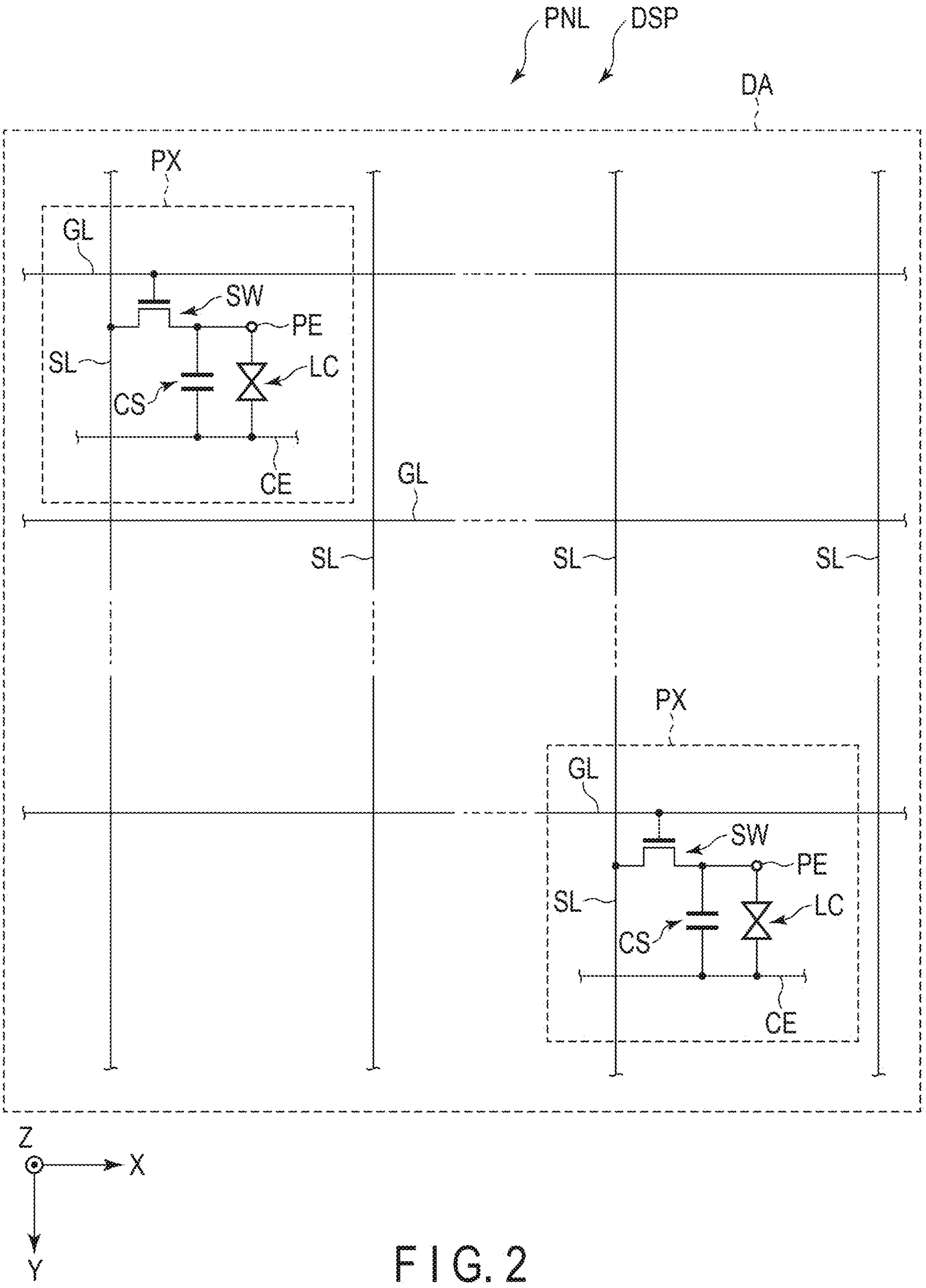
FIG. 2 is a plan view schematically showing a configuration of a display area of the display device in FIG. 1.

FIG. 1 is a plan view schematically showing a configuration of a display device in Embodiment 1. FIG. 2 is a plan view schematically showing a configuration of a display area of the display device in FIG. 1. In Embodiment 1, the first direction X and the second direction Y correspond to a direction parallel to a main surface of the substrate that makes up the display device DSP.

In embodiment 1, a liquid crystal display device in which polymer dispersed liquid crystal (PDLC) is applied is disclosed as a display device DSP. The display device DSP comprises a display panel PNL, a wiring substrate FPC, an IC chip ICP (drive circuit), and a plurality of light sources LS.

The display panel PNL comprises a substrate SUB1 (array substrate), a substrate SUB2 (counter substrate), a liquid crystal layer LC, and a sealant SAL. The substrate SUB1 and substrate SUB2 are formed into a flat plate shape parallel to the X-Y plane so as to oppose each other along the third direction Z. The liquid crystal layer LC is disposed between the substrate SUB1 and substrate SUB2.

The display panel PNLD includes a display area DA for displaying images and a frame-shaped peripheral area PA surrounding the display area DA. The sealant SAL is placed to surround the display area DA. The display area DA comprises a plurality of pixels PX arranged in a matrix pattern along the first direction X and the second direction Y.

The sealant SAL used here is a mixture of photo-curing resin and heat-curing resin, which has been cured. As the photo-curing resin, for example, acrylic resin is used. As the heat-curing resin, for example, epoxy resin is used. Acrylic resin is cured by ultraviolet light (UV), and epoxy resin is cured by heat.

In the display area DA, a plurality of scanning lines GL are provided to extend along the second direction Y and to be aligned along the first direction X. Further, a plurality of signal lines SL are provided to extend along the second direction Y and to be aligned along the first direction X. At each of the intersections of the scanning lines GL and the signal lines SL, a single pixel PX is provided. Each pixel PX is disposed in a region surrounded by each adjacent pair of scanning lines GL and each respective adjacent pair of signal lines SL.

Each of the pixels PX comprises a switching element SW, a pixel electrode PE, and a common electrode CE. The switching element SW is configured, for example, by a thin film transistor (TFT) and is electrically connected to one scanning line GL and one signal line SL. One scanning line GL is electrically connected to the switching element SW in each of multiple pixels PX aligned along the first direction X. One signal line SL is electrically connected to the switching element SW in each of multiple pixels PX aligned along the second direction Y.

The pixel electrode PE is electrically connected to the switching element SW. The common electrode CE is provided in common with multiple pixel electrodes PE. The liquid crystal layer LC is driven by the electric field generated between the respective pixel electrode PE and the common electrode CE. The capacitor CS is formed, for example, between an electrode having the same potential as that of the common electrode CE and an electrode having the same potential as that of the respective pixel electrode PE.

The scanning lines GL, signal lines SL, switching elements SW, and pixel electrodes PE are provided on the substrate SUB1, and the common electrode CE is provided on the substrate SUB2. The scanning lines GL extend out into the peripheral area PA and are electrically connected to an IC chip GIC. The signal lines SL extend out into the peripheral area PA and are electrically connected to an IC chip SIC. When the IC chip GIC and the IC chip SIC are not required to be distinguished from each other, they are referred to as the IC chips ICP (drive circuits).

The IC chips ICP are electrically connected to the wiring substrate FPC. The IC chips ICP each contain, for example, a built-in display driver or the like which outputs signals necessary for image display. Note that the IC chips ICP may be mounted on the wiring substrate FPC.

The wiring substrate FPC is electrically connected to terminals provided on the extending portion Ex of the substrate SUB1. The extending portions Ex correspond to the part of the substrate SUB1, which does not oppose the substrate SUB2. For example, the wiring substrate FPC is a flexible printed circuit board.

Multiple light sources LS are provided to overlap the extending portion Ex. These light sources LS are aligned at intervals along the first direction X. Each of the multiple light sources LS includes, for example, a light emitting element that emits red (R) light, a light emitting element that emits green (G) light, and a light emitting element that emits blue (B) light. For these light emitting elements, for example, light emitting diodes (LEDs) can be used, but the type is not limited to that of this example.

Figure 3:
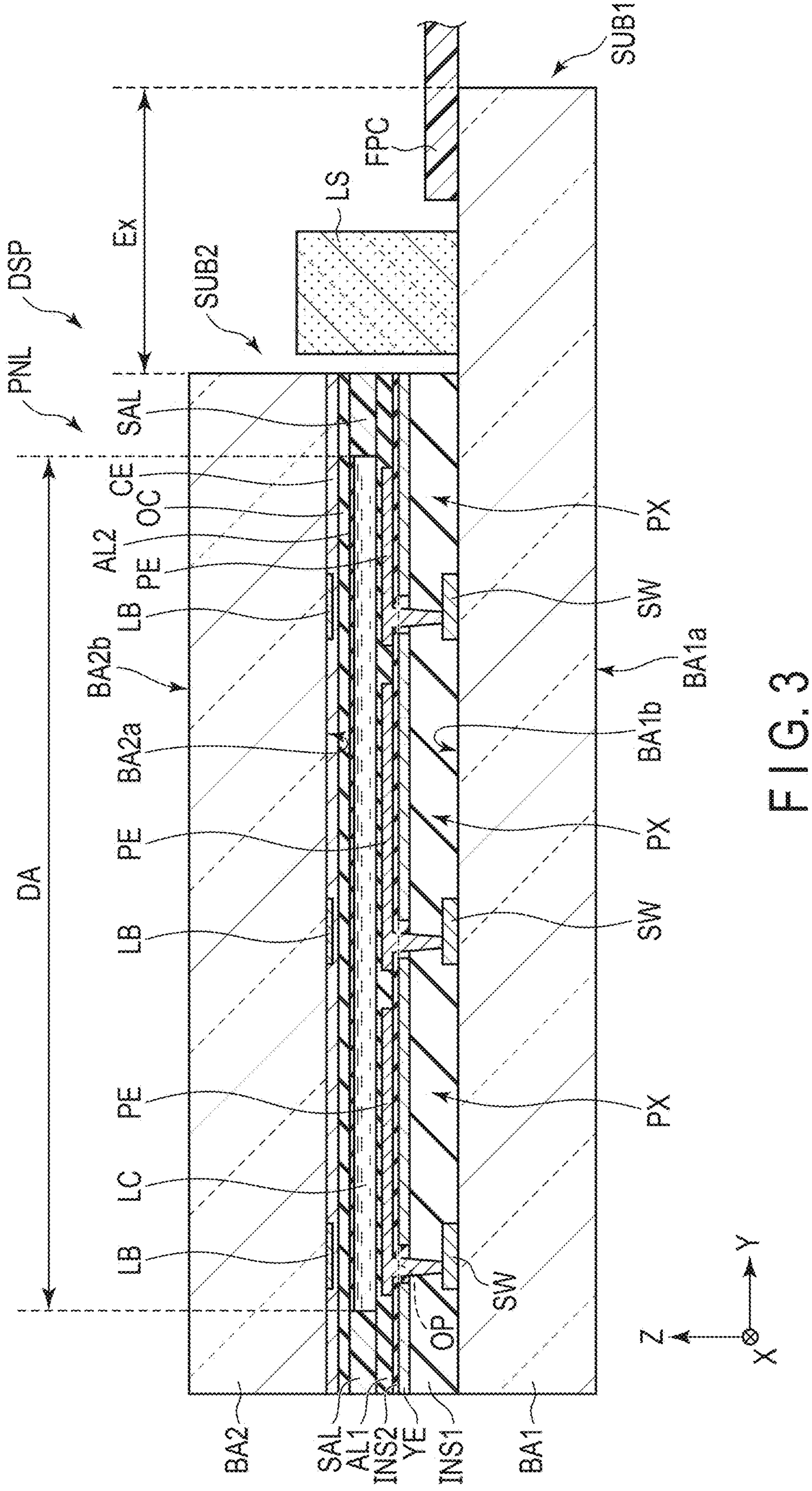
FIG. 3 is a cross-sectional view showing an example of a configuration that can be applied to a display panel shown in FIG. 1.

FIG. 3 is a cross-sectional view showing an example of a configuration that can be applied to the display panel shown in FIG. 1. The substrate SUB1 comprises a base BAL, an insulating layer INS1, an insulating layer INS2, a capacitive electrode YE, an alignment film AL1, a switching element SW, and a pixel electrode PE. The base BAL has a surface BA1*a* and a surface BA1*b* located on an opposite side to the surface BA1*a* along the third direction Z. The surface BA1*a* and surface BA1*b* may as well be referred to as a lower surface and an upper surface of the base BA1, respectively.

The switching elements SW are arranged on the surface BA1*b* side. The insulating layer INS1 covers the switching elements SW. In FIG. 3, the switching element SW is shown in a simplified manner, but in actuality, the switching element SW includes a semiconductor layer and various types of electrodes. In addition, the scanning lines GL and signal lines SL shown in FIG. 1 are disposed between the base BAL and the insulating layer INS1, but in FIG. 3 they are omitted from the illustration.

The capacitive electrode YE is disposed between the insulating layer INS1 and the insulating layer INS2. The pixel electrodes PE are disposed between the insulating layer INS2 and the alignment layer AL1, and are each provided for the respective pixel PX. The pixel electrode PE is electrically connected to the respective switching element SW via an aperture OP of the capacitive electrode YE. The pixel electrode PE opposes the respective capacitive electrode YE and forms the above-described capacitor CS. The alignment film AL1 covers the pixel electrodes PE. Note that the capacitor CS may as well be formed between different electrodes, rather than between the pixel electrode PE and the capacitive electrode YE.

The substrate SUB2 comprises a base BA2, a light shielding layer LB, an overcoat layer (insulating layer) OC, an alignment film AL2, and a common electrode CE. The base BA2 has a surface BA2*a* that opposes the substrate SUB1 and a surface BA2*b* that is located on an opposite side to the surface BA2*a* along the third direction Z. The surface BA2*a* and surface BA2*b* may as well be referred to as a lower surface and an upper surface of the base BA2, respectively.

In this disclosure, the base BAL and the base BA2 may as well be referred to as a first base and a second base, respectively. Further, the alignment film AL1 and the alignment film AL2 may as well be referred to as a first alignment film and a second alignment film, respectively.

The light shielding layer LB and the common electrode CE are disposed on a surface BA2*a* side. For example, the light shielding layer LB opposes the switching elements SW, the scanning lines GL, and the signal lines SL. The common electrode CE is provided over multiple pixels PX so as to oppose the multiple pixel electrodes PE along the third direction Z. Further, the common electrode CE covers the light shielding layer LB. The common electrode CE has the same potential as that of the capacitive electrode YE. The overcoat layer OC covers the common electrode CE. The alignment film AL2 covers the overcoat layer OC. The liquid crystal layer LC is disposed between the alignment film AL1 and alignment film AL2, and is in contact with these alignment film AL1 and alignment film AL2. Note that such a configuration may as well do that the alignment film AL2 covers the common electrode CE without providing an overcoat layer OC.

Further, note that the common electrode CE may be included in the substrate SUB1, rather than in the substrate SUB2. If the common electrode CE is provided on the substrate SUB1, it suffices if the common electrode CE is provided such that a lateral electric field is generated between the pixel electrode PE and the common electrode CE.

The light sources LS and the wiring substrate FPC are provided in the extending portion Ex on the substrate SUB1 (on the base BA1) as described above. The light sources LS may not be provided on the extending portion Ex. The light sources LS may be provided on an opposite side to the extending portion Ex along an opposite direction of the second direction Y, which is located on an outer side of the display panel PNL.

The base BA1 and base BA2 are each, for example, a transparent insulating substrate such as a glass substrate or plastic substrate. The insulating layer INS1 is formed, for example, from a transparent insulating material such as silicon oxide, silicon nitride, silicon oxynitride, or acrylic resin. In one example, the insulating layer INS1 includes an inorganic insulating film and an organic insulating film. The insulating layer INS2 is, for example, an inorganic insulating film such as of silicon nitride. The capacitive electrode YE, the pixel electrodes PE, and the common electrode CE are each, for example, a transparent electrode formed from a transparent conductive material such as indium tin oxide (ITO) or indium zinc oxide (IZO).

Note that the configuration of the display panel PNL is not limited to that of the example shown in FIGS. 1 and 2. For example, the substrate SUB1 may not comprise a capacitive electrode YE. Further, the substrate SUB2 may not comprise a light shielding layer LB.

Furthermore, the display device DSP does not comprise a polarizer. That is, there is no polarizer provided on the surface BA1*a* of the substrate SUB1 of the display panel PNL, and there is no polarizer on the surface BA2*b* of the substrate SUB2, either.

Figure 4:
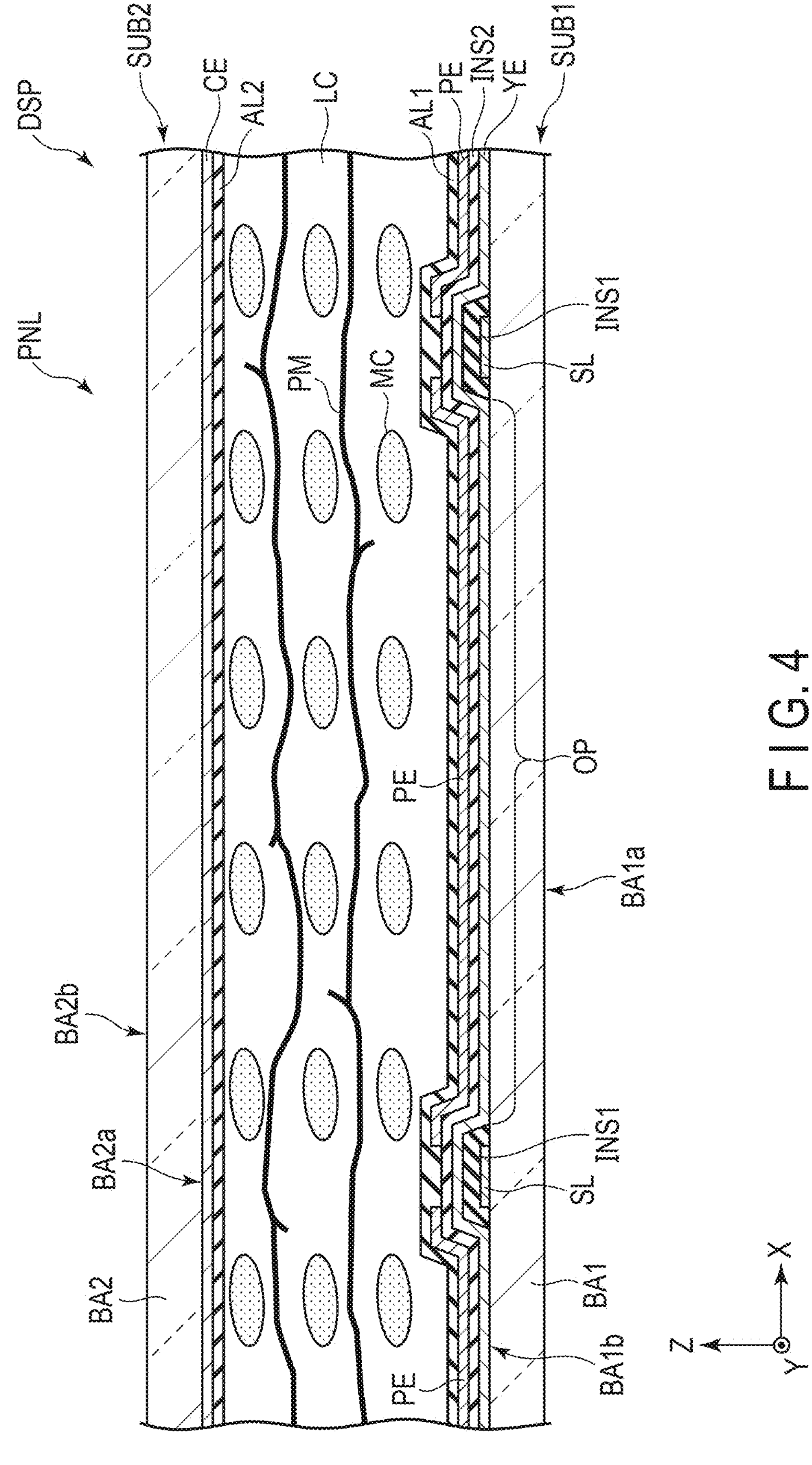
FIG. 4 is a cross-sectional view schematically showing a configuration example of the display panel.

FIG. 4 is a cross-sectional view schematically showing an example of a configuration of the display panel. The display panel PN1 includes the liquid crystal layer LC between the substrate SUB1 and the substrate SUB2. In Embodiment 1, the liquid crystal layer LC is of a polymer-dispersed liquid crystal (PDLC) and contains polymers PM containing polymer chains and liquid crystal molecules MC. The liquid crystal molecules MC are dispersed in the gaps of the polymers PM.

The substrate SUB1 comprises a base BA1, insulating layers INS1, signal lines SL, an insulating layer INS2, a capacitive electrode YE, pixel electrodes PE, and an alignment film AL1.

The insulating layers INS1 are provided on the surface BA1*b* of the base BA1. The signal lines SL are provided between the base BA1 and the respective insulating layers INS1, and are covered by the respective insulating layers INS1. The capacitive electrode YE is provided on the insulating layers INS1, and is covered by the insulating layer INS2.

The pixel electrodes PE are each formed on the respective insulating layer INS2 in the respective aperture OP, and are covered by the alignment film AL1. That is, the capacitive electrode YE is provided between the base BA1 and the pixel electrodes PE. The pixel electrodes PE each oppose the capacitive electrode YE while interposing the insulating layer INS2, and forms the capacitor CS of the pixel PX. The alignment film AL1 is in contact with the liquid crystal layer LC.

The substrate SUB2 comprises a base BA2, a common electrode CE, and an alignment film AL2. As in the case shown in FIG. 3, an overcoat layer may be provided between the common electrode CE and the alignment film AL2. The common electrode CE is provided in contact with the surface BA2*a* of the base BA2 and is covered by the alignment film AL2.

Note that in the substrate SUB2, light-shielding layers may be provided directly above the switching elements SW, the scanning lines GL, and the signal lines SL, respectively. Further, a transparent insulating layer (overcoat layer) may be provided between the substrate BA2 and the common electrode CE. The common electrode CE is provided to oppose multiple pixel electrodes PE. Furthermore, the common electrode CE is electrically connected to the capacitive electrode YE and is at the same potential as the capacitive electrode YE. The alignment film AL2 is in contact with the liquid crystal layer LC.

The polymers PM and the liquid crystal molecules MC each have optical anisotropy or refractive index anisotropy. The responsivity of the polymers PM to an electric field is lower than the responsivity of the liquid crystal molecules MC to the electric field. For example, the alignment direction of the polymers PM does not substantially change regardless of the electric field between the respective pixel electrode PE and the common electrode CE. On the other hand, the alignment direction of the liquid crystal molecules MC changes in response to the electric field.

In the state where no electric field is acting on the liquid crystal layer LC, or the electric field is extremely weak, the optical axes of the polymers PM and the liquid crystal molecules MC are approximately parallel to each other. The refractive indices of the liquid crystal molecules MC and the polymers PM become substantially equal to each other. In other words, there is no substantial difference in refractive index created between the liquid crystal molecules MC and the polymers PM. With this configuration, light that enters the liquid crystal layer LC is transmitted without substantially being scattered within the liquid crystal layer LC. Such a state will be referred to as a transparent state, hereinafter. The voltage of the pixel electrode PE that achieves the transparent state is referred to as a transparency voltage. The transparency voltage may be the same as the common voltage applied to the common electrode CE, or it may be a voltage that differs slightly from the common voltage.

On the other hand, in a state where a sufficient electric field is being applied to the liquid crystal layer LC, the optical axes of the polymers PM and the liquid crystal molecules MC intersect each other. Therefore, the light that enters the liquid crystal layer LC is scattered within the liquid crystal layer LC. Such a state will be referred to as a scattering state, hereinafter. Note here that the voltage of the pixel electrode PE that achieves the scattering state is referred to as a scattering voltage. The scattering voltage is a voltage in which the potential difference with the common electrode CE is greater than that with the transparency voltage.

As described above, in the display device that uses the polymer dispersed liquid crystals (PDLC) as the liquid crystal layer LC, the pixels PX are driven by field sequential driving. In order to drive the display device at a higher speed, multiple signal lines SL are provided between each adjacent pair of pixels PX. With this configuration, video signals can be written to pixels in multiple rows at the same time.

However, the operating temperature range of the polymer-dispersion liquid crystals is narrow, and therefore in a display device that uses polymer-dispersion liquid crystals (PDLC) as the liquid crystal layer LC, there is a risk that the liquid crystal layer LC may not operate at low temperatures, resulting in display errors. Therefore, in such a display device, there may be restrictions in the operational environmental conditions, especially in terms of temperature range. Or, there may be cases where it is necessary to add a heater or the like to the display device separately, which will increase the manufacturing process and manufacturing costs.

In the display device DSP of Embodiment 1, a function as a heat source is added to the signal lines SL for sending the video signal to the pixels PX. With this configuration, the liquid crystal layer LC can be placed in a temperature range in which the polymer dispersed liquid crystal can be driven. Thus, it is possible to obtain a display device that is restricted by operational environmental conditions.

The heat source in Embodiment 1 is provided in the test circuit. The test circuit is used to check whether the signal lines SL, scanning lines GL, switching elements SW (thin film transistor (TFT)), etc. are normally functional or not before mounting the IC chip ICP (drive circuit) and wiring substrate FPC.

Figure 5:
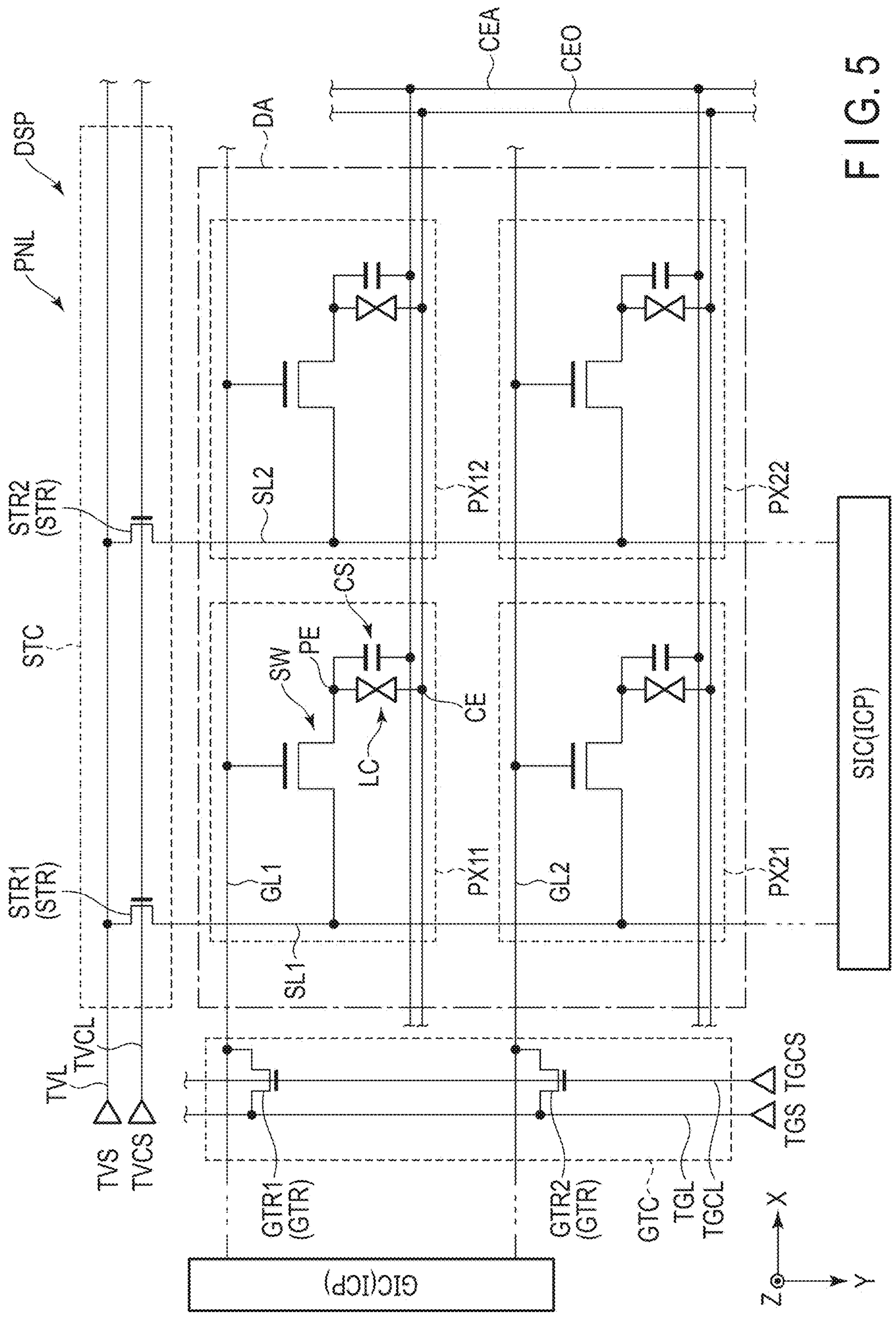
FIG. 5 is a circuit diagram showing a schematic configuration of the display area and test circuit of the display device.

FIG. 5 is a circuit diagram showing brief configurations of the display area and test circuit of the display device. The display device DSP shown in FIG. 5 comprises a scanning line test circuit GTC and a signal line test circuit STC provided on an outer side of the display area DA.

The scanning line test circuit GTC is provided between the display area DA and the IC chip GIC. The scanning line test circuit GTC is electrically connected to multiple scanning lines GL. The scanning line test circuit GTC comprises multiple transistors GTR, which are inspection switches. That is, each of the multiple scanning lines GL is electrically connected to the scanning line test circuit GTC and the IC chip GIC.

The signal line test circuit STC is provided between the display area DA and the IC chip SIC. The signal line test circuit STC is electrically connected to multiple signal lines SL. The signal line test circuit STC comprises multiple transistors STR, which are inspection switches. That is, each of the signal lines SL is electrically connected to the signal line test circuit STC and the IC chip SIC.

It is assumed here that the multiple scanning lines GL include m scanning lines GL1 to GLm. It is also assumed that the multiple signal lines SL include n signal lines SL1 to SLn. The multiple transistors GTR are assumed to include m transistors GTR1 to GTRm. The multiple transistors STR are assumed to include n transistors STR1 to STRn.

Each of the pixels PX is provided in a region surrounded by each adjacent pair of scanning lines GL and each respective adjacent pair of signal lines SL. Each of the pixels PX includes one scanning line GL, one signal line SL, one switching element SW, and one capacitor CS.

Note that in FIG. 5, the common electrodes CE are each connected to the wiring portion CEO, and one of the pair of electrodes of each capacitor CS is connected to the wiring portion CEA. The wiring portion CEO is provided on the substrate SUB2, and the wiring portion CE1 is provided on the substrate SUB1. Note that the configuration of the display device DSP of Embodiment 1 is not limited to this. As in the case shown in FIG. 2, the common electrode CE and one of the pair of electrodes of the capacitor CS may be connected to the same wiring portion.

FIG. 5 shows a pixel PX11 including a scanning line GL1 and a signal line SL1, a pixel PX21 including a scanning line GL2 and a signal line SL1, a pixel PX12 including a scanning line GL1 and a signal line SL2, and a pixel PX22 including a scanning line GL2 and a signal line SL2.

The m transistors GTR1 to GTRm are electrically connected to the scanning lines GL1 to GLm, respectively. The n transistors STR1 to STRn are electrically connected to the signal lines SL1 to SLn, respectively. When the transistors GTR1 to GTRm are not to be distinguished from each other, they are referred to as transistors GTR. When the transistors STR1 to STRn are not distinguished from each other, they are referred to as transistors STR.

The gates of the transistors GTR are electrically connected to wiring lines TGCL, respectively. The sources of the transistors GTR are electrically connected to wiring lines TGL, respectively. The drains of the transistors GTR are electrically connected to the scanning lines GL, respectively. To the gates of the transistors GTR, inspection scanning control signals TGC are input via the wiring lines TGC, respectively. To the sources of the transistors GTR, inspection scanning signals TGS are input via the wiring lines TGL, respectively.

The gates of the transistors STR are electrically connected to the wiring lines TVCL, respectively. The sources of the transistors STR are electrically connected to the wiring lines TVL, respectively. The drains of the transistors STR are electrically connected to the signal lines SL, respectively. To the gates of the transistors STR, test video control signal TVCSs TVCS are input via the wiring lines TVCL, respectively. To the sources of the transistors STR, test video signals TVS are input via the wiring lines TVL, respectively.

During inspection before the mounting of the IC chip ICP, the inspection test scanning signals TGS are input from the scanning line test circuit GTC to the scanning lines GL. Similarly, the test video signals TVS are input from the signal line test circuit STC to the signal lines SL. With this operation, the switching elements SW are driven to write the video signals to the pixels PX. Thus, defects in the display panel PNL, if any, can be detected. If there are no errors found in the display panel PNL, the IC chip ICP and the wiring substrate FPC are mounted, and the display device DSP is completed.

Although not shown in the figures, in order to detect defects between adjacent signal lines SL and adjacent scanning lines GL, these lines are grouped into separate systems by odd and even rows or odd and even columns.

Originally, after the display device DSP is completed, the scanning line test circuit GTC and signal line test circuit STC are not necessary. Therefore, it is necessary to prevent the scanning line test circuit GTC and signal line test circuit STC from being driven. For example, the transistor GTR is set in the off state at all times, and similarly, the transistor STR as well is set in the off state at all times. However, as will be explained later, in this embodiment, the scanning line test circuit GTC and the signal line test circuit STC are reused as heat sources after the IC chip ICP and wiring substrate FPC are mounted.

Figure 6:
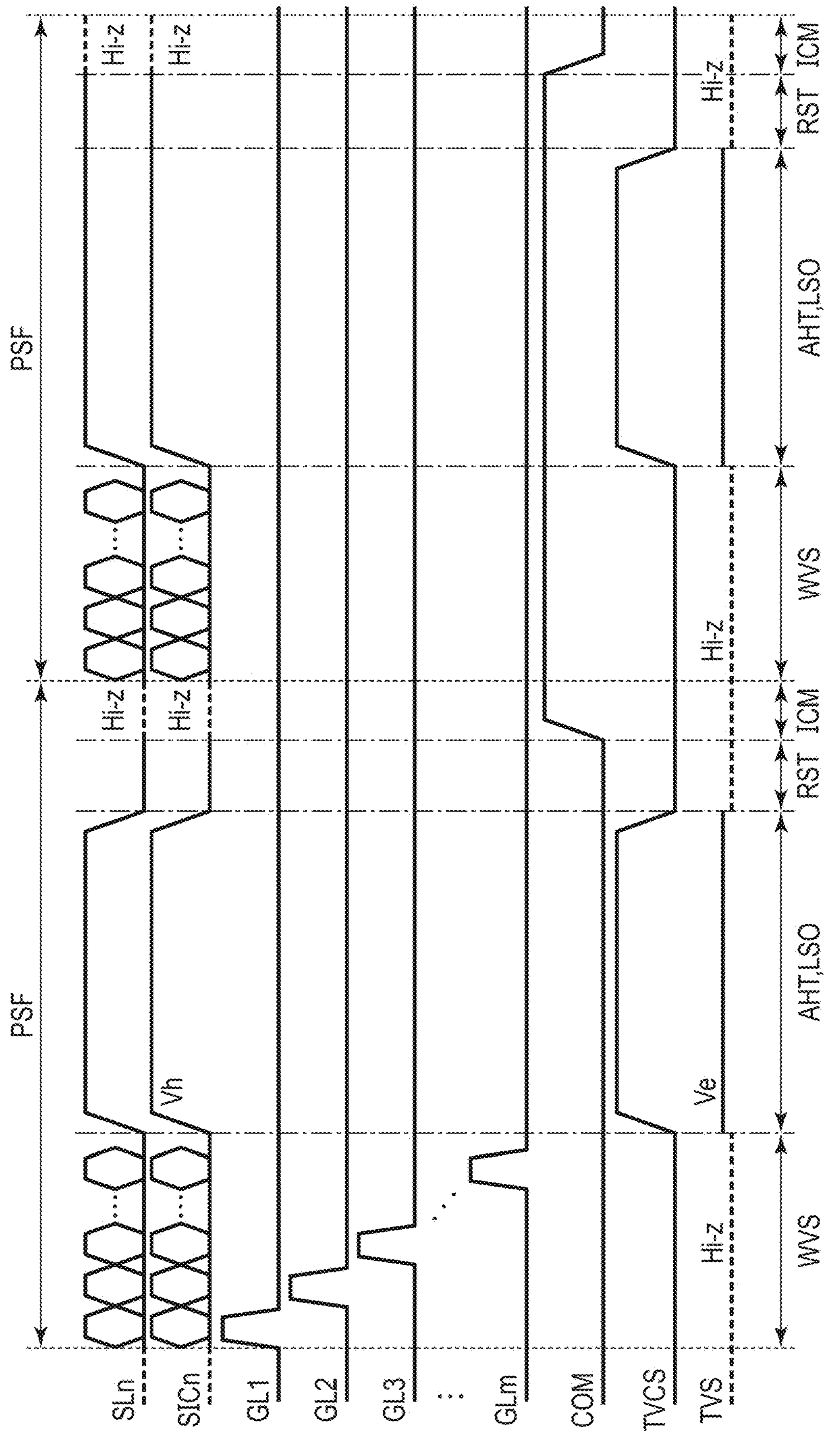
FIG. 6 is a diagram showing a timing chart of driving of the display device.

FIG. 6 is diagram showing a timing chart for driving the display device. Each one sub-frame period PSF shown in FIG. 6 includes a video signal writing period WVS, a heat generation power supply period AHT, a light source on period LSO, a reset period RST, and a common voltage inversion period ICM.

In the video signal writing period WVS, the scanning drive signals are input to the scanning lines GL1 to GLm, sequentially. To the scanning lines GL1 to GLm, the scanning line drive signals are input sequentially. As a result, the scanning lines GL1 to GLm shift their respective states from a low potential state (which may as well be referred to as a low state) to a high potential state (which may as well be referred to as a high state) and from a high potential state to a low potential state, sequentially.

When each of the scanning lines GL1 to GLm is shifted from the low potential state to the high potential state, the switching elements SW of those pixels PX which are connected to the scanning lines GL shifted to the high potential state are set in the on state. Then, the video signals are input to the signal lines SL1 to SLn sequentially. While the video signals are being input to the signal lines SL1 to SLn, the scanning line test circuit GTC and the signal line test circuit STC are not driven, as described above. When the video signals are input to all the signal lines SL1 to SLn, those scanning lines GL which are in a high potential state are shifted to the low potential state. In this manner, the switching elements SW which are in the on state are set in an off state.

During the video signal writing period WVS, a voltage COM applied to the common electrode CE is at a low potential state. The potential of the test video control signal TVCS is at a low potential state. With these states, the transistors STR are set in the off state. Here, the potential of the test video signal TVS is at a high impedance state (Hi-z).

During the heat generation power supply period AHT and the light source on period LSO, the signal lines SL are written with the voltage Vh of the high potential state from the IC chip SIC. The test video control signals TVCS of the high potential state are input to the gates of the transistors STR of the signal line test circuit STC. Thus, the transistors STR are set into the on state.

To the sources of the transistors STR, the test video signals TVS of a voltage Ve are input via the wiring lines TVL. As described above, the scanning lines GL are in the low potential state and the switching elements SW are in the off state, the test video signals TVS of the voltage Ve are not written to the pixels PX. Here, it suffices if the voltage Ve is lower than the voltage Vh. But note that the configuration is not limited to this, and the voltage Ve may be higher than the voltage Vh. When the voltage Ve and voltage Vh are different from each other, the potential difference is created as will be described later, and Joule heat will be generated.

During the heating power supply period AHT and the light source on period LSO, the potential of the low potential state is applied to the scanning lines GL1 to GLm. Thereby, the switching elements SW of the pixels PX are set in the off state. The voltage COM applied to the common electrode CE is in the low potential state.

During the light source on period LSO, in which the light sources LS are turned on, the switching elements SW of the pixels PX are in the off state, and therefore no signal is written to the pixels PX, as described above. Note here that when the heat generation power supply period AHT is provided at the same time as the light source on period LSO, there is no need to provide a separate heat generation power supply period AHT.

As described above, the voltage Ve is input to the signal lines SL from the sources of the transistors STR, and the voltage Vh is input thereto from the IC chip SIC. Thereby, a potential difference ΔV (=Vh−Ve) is created in the signal lines SL. When a potential difference ΔV is generated, Joule heat is generated due to the resistance of the signal lines SL. By the Joule heat thus generated, the liquid crystal layer LC and the display panel PLN are heated.

Figure 7:
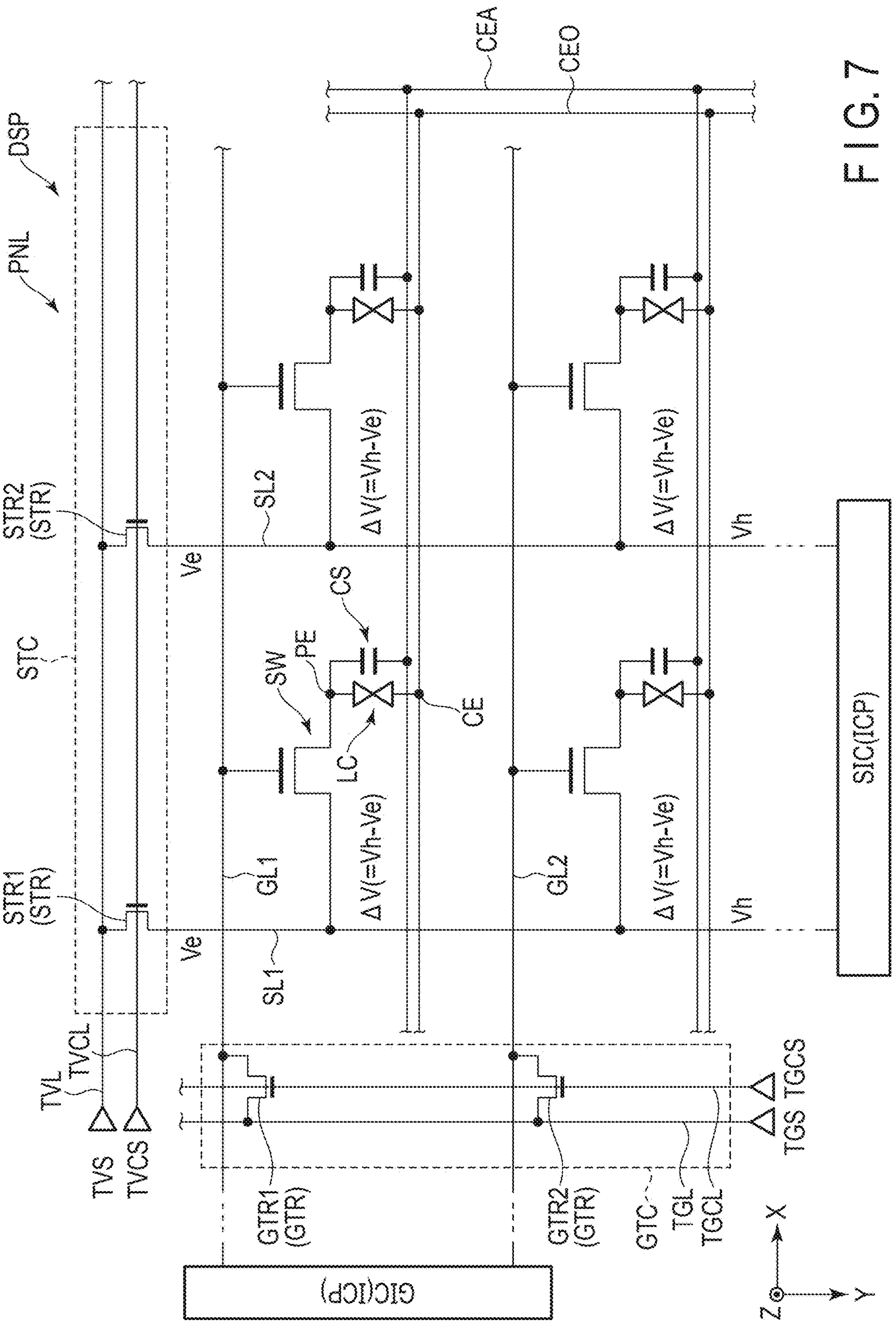
FIG. 7 is a diagram showing voltage applied to a signal line during a heat generation power supply period.

FIG. 7 is a diagram showing the voltage applied to the signal lines during the heat generation power supply period. As described above, by utilizing the generated Joule heat, it is possible to obtain a display device that is not restricted by the operational environmental conditions.

Referring back to FIG. 6, when the heat-generating power supply period AHT is ended, the test video control signal TVCS is set to the low potential state. Thus, the transistors STR are set to the off state. As a result, the voltage Ve is no longer applied to the signal lines SL, and the generation of Joule heat stops.

After the heat generation power supply period AHT is ended, one sub-frame period PSF is ended after the reset period RST and the common voltage inversion period ICM. In the common voltage inversion period ICM, the voltage COM applied to the common electrode CE is inverted from a low potential state to a high potential state. The voltage COM repeats inversion between a low potential state and a high potential state for each sub-frame period PSF.

The potential applied to a signal line SLn and the potential of the signal applied thereto from the IC chip SIC are in a low potential state during the reset period RST. The potential applied to the signal line SLn and the potential of the signal from the IC chip SIC are in a high impedance state (Hi-z) during the common voltage inversion period ICM.

Further, in the reset period RST and the common voltage inversion period ICM, the potential of the test video control signal TVCS is set to a low potential state, as in the case of the video signal writing period WVS. In the reset period RST and the common voltage inversion period ICM, the potential of the test video signal TVS is set to a high impedance state (Hi-z), as in the case of the video signal writing period WVS.

In the timing chart shown in FIG. 6, the heat generation power supply period AHT is provided for each sub-frame period PSF, but Embodiment 1 is is not limited to this. The heat generation power supply period AHT may be provided once every two sub-frame periods PSF, for example. The frequency of the heat generation power supply period AHT with respect to the sub-frame period PSF may be changed in accordance with the ambient temperature of the display device DSP.

Further, by changing the output voltage of the IC chip SIC, that is, voltage Vh, the amount of heat generation can be controlled. For example, by increasing the voltage Vh, the potential difference ΔV can be increased. As the potential difference ΔV is increased, the amount of heat generation will increase. Thus, by changing the voltage Vh in accordance with the ambient temperature of the display device, DSP, it is possible to change the amount of heat generation.

In the display device DSP of Embodiment 1, the liquid crystal layer LC, which contains polymer-dispersed liquid crystals, is heated using the signal line test circuit STC. Thus, the temperature of the liquid crystal layer LC can be increased without separately providing a heat source outside such as a heater. Thus, it is possible to obtain a display device that is not restricted by operational environment conditions, while suppressing a decrease in the display quality of the display device DSP.

Embodiment 2

Figure 8:
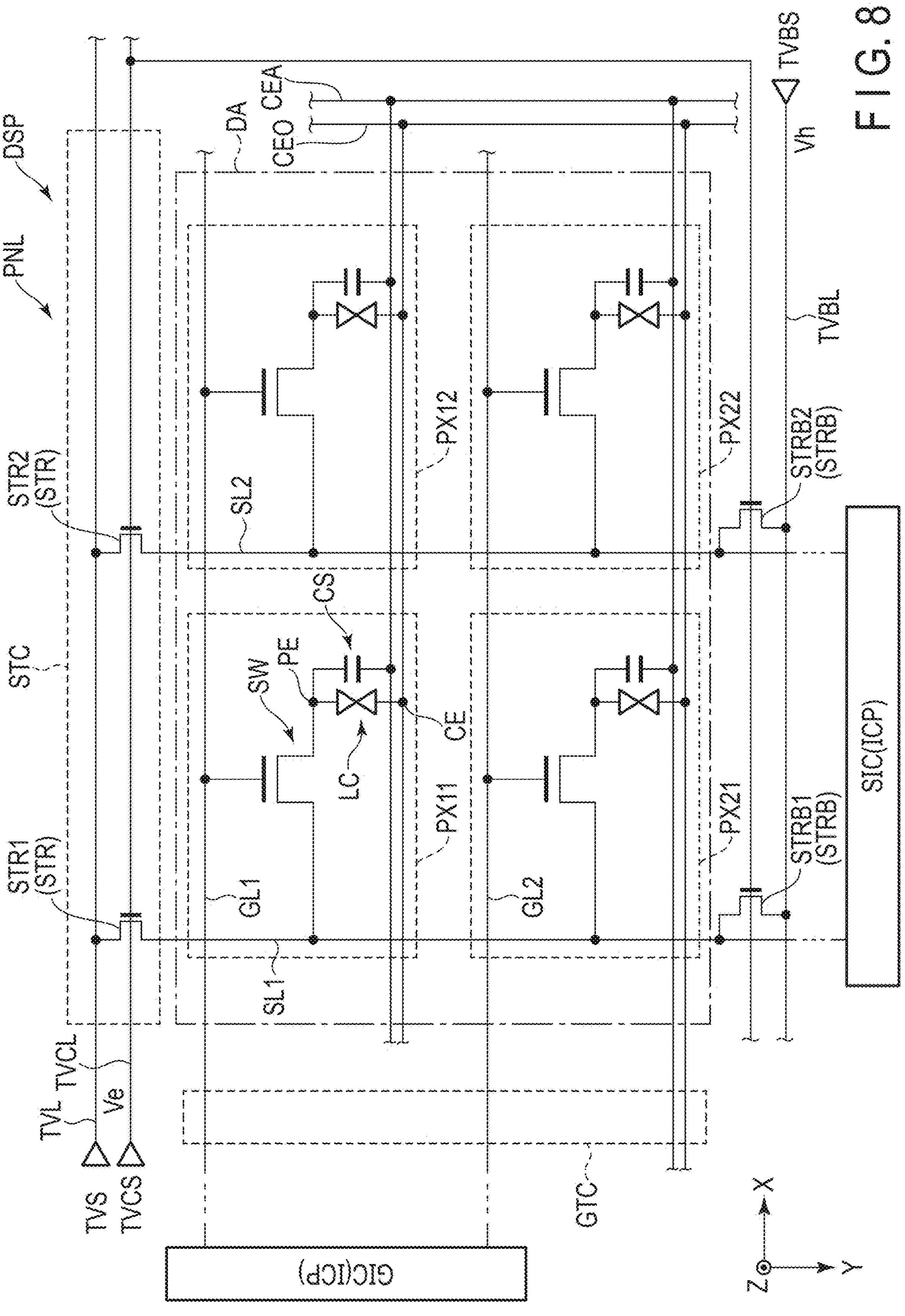
FIG. 8 is a circuit diagram showing a configuration example of a display device in Embodiment 2.

FIG. 8 is a circuit diagram showing a configuration example of a display device in Embodiment 2. The example configuration shown in FIG. 8 is different as compared to the example configuration shown in FIG. 5 in that a transistor is provided on the IC chip SIC side as well.

In the display device DSP shown in FIG. 8, a transistor STRB, which is equivalent to the transistor STR, which is a testing switch, is provided between the IC chip SIC and each signal line SL. With this configuration, in order to generate heat in the signal line SL, power is supplied from the wiring line TVBL connected to the transistor STRB, rather than from the IC chip SIC.

As described above, the transistor STRB, a wiring line TVBL, and a wiring line TVCL are provided between the IC chip SIC and the signal line SL. Note that the transistor STRB includes a transistor STRB1 and a transistor STRB2.

The gates of the transistors STRB are connected to the wiring line TVCL. The sources of the transistors STRB are connected to the wiring line TVBL. The drains of the transistors STRB are connected to the respective signal lines SL.

The wiring line TVCL extends from an outer side of the display area DA along an edge of the display area DA and reaches from the signal line test circuit STC to the gates of the transistors STRB. To the gates of the transistors STRB, the test video control signal TVCS is input via the wiring line TVCL. To the sources of the transistors STRB, the test video signal TVBS is input via the wiring line TVBL.

Note that in FIG. 8, for the sake of clarity, the detailed configuration of the scanning line test circuit GTC or the like is omitted.

Figure 9:
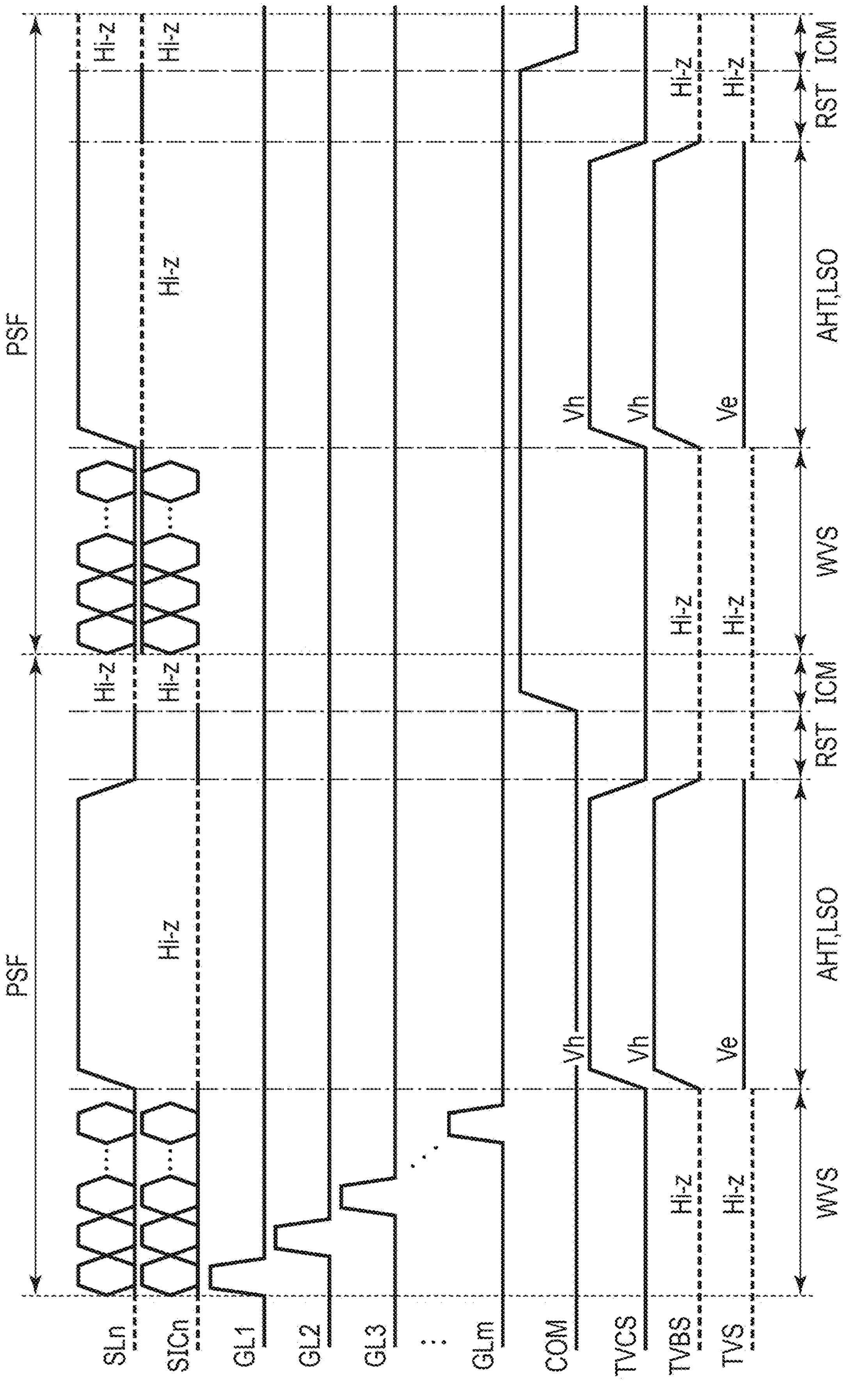
FIG. 9 is a diagram showing a timing chart of driving of the display device.

FIG. 9 is a diagram showing a timing chart for driving the display device. In the timing chart shown in FIG. 9, an output from the IC chip SIC is not performed during the heat supply period AHT, and in place, a high impedance (Hi-z) state is created, unlike that in the timing chart shown in FIG. 6.

Note that in FIG. 9, the driving of the signal lines SLn, the scanning line GL1, the scanning line GL2, the scanning line GL3, the scanning line GLm, and the voltage COM is similar to that of FIG. 6, and therefore the explanation in FIG. 6 is applied and it is omitted here.

During the heat generation power supply period AHT, the test video control signal TVCS of the high potential state is input to the gates of the transistors STR via the wiring line TVCL. Thereby, the transistors STR are set in the on state.

To the sources of the transistors STR, the test video signal TVS of the low potential state (voltage Ve) is input via the wiring line TVL.

To the gates of the transistors STRB, the test video control signal TVCS of the high-potential state is input via the wiring line TVCL. Thereby, the transistors STRB are set in the on state.

To the sources of the transistors STRB, the test video signal TVBS of the high-potential state (voltage Vh) is input via the wiring line TVBL.

As described above, to the signal lines SL, the voltage Ve is input from the sources of the transistors STR, and the voltage Vh is input from the sources of the transistors STRB. With this configuration, a potential difference ΔV (=Vh−Ve) is created in the signal lines SL. When a potential difference ΔV is generated, Joule heat is generated due to the resistance of the signal lines SL. The Joule heat thus generated heats the liquid crystal layer LC and, further, the display panel PLN.

As in the case of Embodiment 1, in Embodiment 2 as well, it suffices if the voltage Ve is lower than the voltage Vh. But, the configuration is not limited to this, and the voltage Ve may be higher than the voltage Vh. When the voltage Ve and voltage Vh are different from each other, a potential difference ΔV is generated, and Joule heat is generated.

When the heating power supply period AHT is ended, the test video control signal TVCS is set to the low potential state. Thereby, the transistor STR and transistor STRB are set in the off state. As a result, the voltage is no longer applied to the signal lines SL, and the generation of Joule heat stops.

In Embodiment 2 described above, by using the generated Joule heat, it is possible to obtain a display device that is not restricted by operational environmental conditions.

Further, here, the IC chip SIC is not used, and therefore the self-consumption power of the IC chip SIC can be suppressed. Thus, power can be supplied directly from the power supply or the like as a test video signal TVBS, without going through the IC chip SIC. Therefore, it is possible to suppress power loss as a display device DSP.

In this disclosure, the transistors STR may as well be referred to as first signal line test transistors as well, and the transistors STRB may as well be referred to as second signal line test transistors. The transistors GTR may as well be referred to as scanning line test transistors. The IC chip GIC and the IC chip SIC may as well be referred to a scanning line IC chip and a signal line IC chip, respectively. The wiring line TVL may as well be referred to as a first test video wiring line as well, the wiring line TVCL may as well be referred to as a test video control wiring line, and the wiring line TVBL may as well be referred to as a second test video wiring line. The voltage Vh and voltage Ve may as well be referred to as a first voltage and a second voltage, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
- an array substrate;
- a counter-substrate;
- an liquid crystal layer provided between the array substrate and the counter-substrate; and
- a plurality of light sources,
- wherein
- the array substrate comprises:
- a plurality of scanning lines;
- a plurality of signal lines;
- a plurality of pixels each provided at an intersection of each one of the plurality of scanning lines and each respective one of the plurality of signal lines;
- a signal line test circuit connected to the plurality of signal lines;
- a plurality of first signal line test transistors provided in the signal line test circuit and connected to the plurality of signal lines;
- a video control test wiring line connected to gates of the plurality of first signal line test transistors;
- a first video test wiring line connected to sources of the plurality of first signal line test transistors; and
- a signal line IC chip connected to one end of each of the plurality of signal lines, and
- a drain of each of the plurality of first signal line test transistors is connected to an other end of each respective one of the plurality of signal lines,
- the signal line IC chip applies a first voltage from one end of each of the plurality of signal lines during a light source on period of the plurality of light sources, and
- a video control test signal is input via the video control test wiring line during the light source on period, thereby setting the plurality of first signal line test transistors to an on state, and
- a second voltage different from the first voltage is applied from the source of each of the plurality of first signal line test transistors set in the on state.

2. The display device according to claim 1, wherein the second voltage is lower than the first voltage.

3. The display device according to claim 1, wherein the liquid crystal layer is a liquid crystal layer containing polymer-dispersed liquid crystals.

4. The display device according to claim 1, further comprising:
- a scanning line test circuit connected to the plurality of scanning lines; and
- a plurality of scanning line test transistors provided in the scanning line test circuit and connected to the plurality of scanning lines.

5. A display device comprising:
- an array substrate;
- a counter-substrate;
- an liquid crystal layer provided between the array substrate and the counter-substrate; and
- a plurality of light sources,
- wherein
- the array substrate comprises:
- a plurality of scanning lines;
- a plurality of signal lines;
- a plurality of pixels each provided at an intersection of each one of the plurality of scanning lines and each respective one of the plurality of signal lines;
- a signal line test circuit connected to the plurality of signal lines;
- a plurality of first signal line test transistors provided in the signal line test circuit and connected to the plurality of signal lines;
- a video control test wiring line connected to gates of the plurality of first signal line test transistors;
- a first video test wiring line connected to sources of the plurality of first signal line test transistors;
- a signal line IC chip connected to one end of each of the plurality of signal lines; and
- a plurality of second signal line test transistors provided between the signal line IC and the plurality of pixels, and
- a drain of each of the plurality of first signal line test transistors is connected to one end of each respective one of the plurality of signal lines,
- a drain of each of the plurality of second signal line test transistors is connected to an other end of each respective one of the plurality of signal lines, a video control test signal is input via the video control test wiring line during a light source on period of the plurality of light sources, thereby the plurality of first signal line test transistors and the plurality of second signal line test transistors are set in an on state, a first voltage is applied to one end of each of the plurality of signal lines from a drain of each respective one of the plurality of first signal line test transistors set in the on state during the light source on period, and a second voltage that is different from the first voltage is applied to the other end of each of the plurality of signal lines from a drain of each respective one of the plurality of second signal line test transistors set in the on state during the light source on period.

6. The display device according to claim 5, wherein the second voltage is lower than the first voltage.

7. The display device according to claim 5, wherein the liquid crystal layer is a liquid crystal layer containing polymer-dispersed liquid crystals.

8. The display device according to claim 5, further comprising:

a scanning line test circuit connected to the plurality of scanning lines; and a plurality of scanning line test transistors provided in the scanning line test circuit and connected to the plurality of scanning lines.

* * * * *